United States Patent [19]

Kimball et al.

[11] 4,294,324
[45] Oct. 13, 1981

[54] CAB SUSPENSION AND RESTRAINING DEVICE

[75] Inventors: Charles A. Kimball; Marc L. Sullivan, both of Salt Lake County, Utah

[73] Assignee: Time Commercial Financing Corporation, Salt Lake City, Utah

[21] Appl. No.: 99,467

[22] Filed: Dec. 3, 1979

[51] Int. Cl.³ ............................................. B62D 23/00
[52] U.S. Cl. .............................. 180/89.14; 267/64.27; 296/35.1; 296/190
[58] Field of Search ............... 180/89.14, 89.15, 89.16; 296/35.1, 190; 280/111; 267/64 R, 65 R, 8 R

[56] References Cited

U.S. PATENT DOCUMENTS 3,045,999 7/1962 Firse .................................. 280/711
3,948,341 4/1976 Foster ............................. 180/89.15

*Primary Examiner*—Joseph F. Peters, Jr.
*Assistant Examiner*—John A. Carroll

*Attorney, Agent, or Firm*—Mallinckrodt & Mallinckrodt

[57] ABSTRACT

A new type of cab suspension and restraining device is provided to retain, in operational position, an automotive truck cab that is pivoted to be swung between an operational position above the truck engine and a maintenance position where the engine is exposed (especially such a cab of the tractor unit of a truck-trailer combination). The device is constructed to provide the cab with a cushioned, air suspension ride by providing a normal air spring between the restraining elements. The device has a housing shell carrying an air spring whose bearing block extends beyond the shell. A portion of this shell fits telescopically into a second housing shell, and restraining means secure the two so that a portion of the first shell is always within the second shell to substantially prevent relative lateral movement of the two but allowing limited relative axial in and out movement thereof to permit operation of the air spring when in operational position.

10 Claims, 6 Drawing Figures

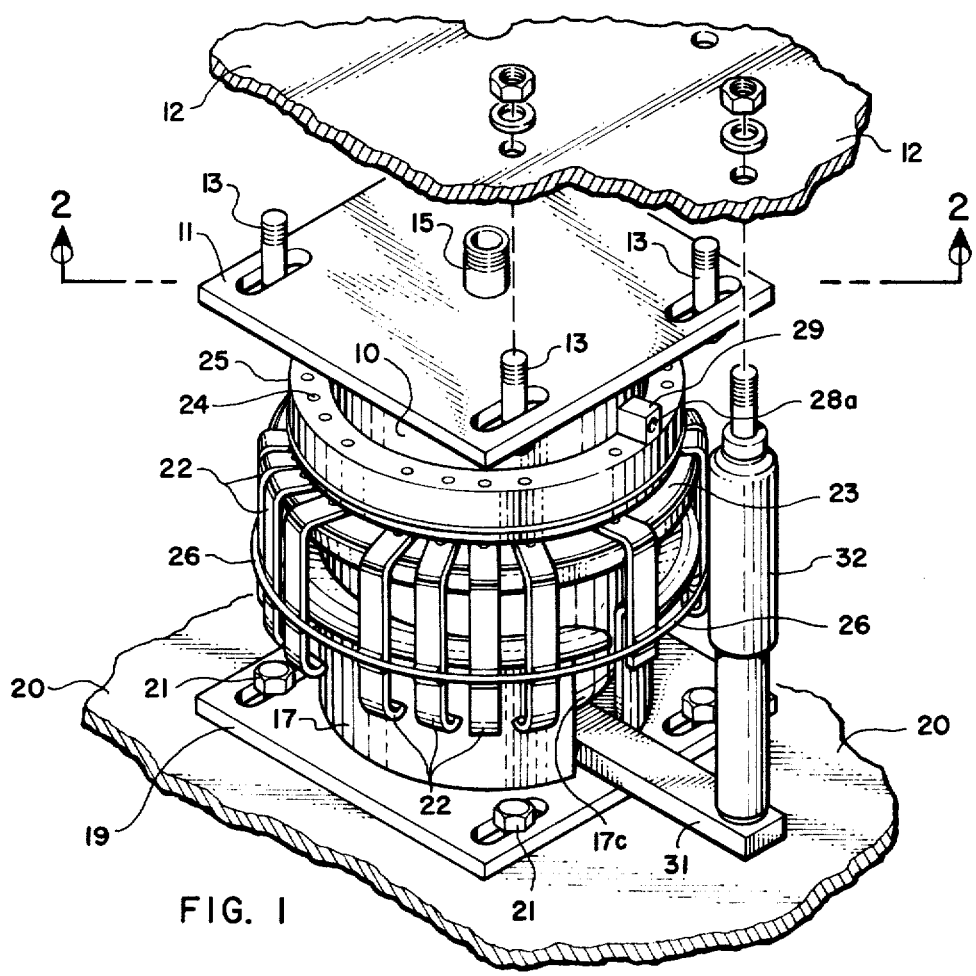

CAB SUSPENSION AND RESTRAINING DEVICE

BACKGROUND OF THE INVENTION

1. Field

The invention is in the field of hydraulically operated devices to restrain movement of the cab of a tractor-trailer, automotive, transport truck that has its cab pivoted to be swung between maintenance and operational position relative to the engine of the tractor.

2. State of the Art

Mechanical latching devices are currently used to hold the cab of a tractor-trailer truck in operational position as the truck travels down the road, see, for example, Brimhall U.S. Pat. No. 3,797,882, Nordell et al. U.S. Pat. No. 3,752,519, and Kimball U.S. Pat. No. 4,159,136. The aforementioned patents feature a mechanical latch having an elongate, pivoted, hooked latching member which engages a keeper bar and is held in engaged latched position by action of a compression spring. A latch of this type does not eliminate all relative movement between the tractor chassis and the cab, and, although the compression spring tends to soften some of this relative movement, such movement still provides an uncomfortable ride for those in the cab and results in jarring impacts of the cab.

Some attempts have been made to incorporate an air spring between the tractor chassis and the cab to improve the ride. Such attempts have used a standard latch and bracing between the cab and tractor chassis to prevent relative lateral movement between the two.

The need for improvement in the ride of cab-over-engine truck tractor units remains despite the existence of air spring suspension systems. There are currently no devices available that combine a suspension system with means for keeping the cab in operational position.

SUMMARY OF THE INVENTION

According to the invention, a cab suspension and restraining device for use in retaining in operational position an automotive tractor truck cab of the type that is pivoted to be swung between a maintenance position, where the engine is exposed, and an operational position, where the cab is over the engine and the truck is in condition to be driven, includes an air spring between the cab and the tractor chassis to improve the ride in the cab and is constructed to prevent relative lateral movement between the cab and tractor chassis when the cab is in operational position.

The device has a housing shell carrying an air spring therein with the bearing block of the air spring extending beyond the shell. The shell is adapted to telescope into a second housing shell when the truck cab is moved into operational position, so that a portion of the first shell is always within the second shell to substantially prevent relative lateral movement of the two while still permitting limited axial movement so that the air spring can operate normally. Restraining means are provided to prevent separation of the telescoped housing shells during operation of the vehicle.

In the preferred form of the invention, the second shell terminates in an outwardly sloped lip at the end thereof which is directed toward the first shell, for guiding the first shell into the second during movement of the cab from its maintenance position to its operational position. The lip terminates in a reverse-curled rim and the restraining means includes a plurality of hooked members secured to and extending from the first shell. The hooked members are resiliently biased toward the second shell, so that with the cab in operational position, the hooks will engage the rim after limited outward axial relative movement of the two shells to thereby keep the first shell telescoped within the second and prevent relative lateral movement of the two, yet to permit axial movement of the two relative to each other as the air spring yields and extends during travel of the vehicle.

Hydraulically actuated means are preferably provided to spread the hooked members against the resilient bias, so that they will not engage the rim of the second housing shell when it is desired to move the cab into maintenance position away from the tractor chassis.

THE DRAWINGS

In the accompany drawings, which represent the best mode presently contemplated for carrying out the invention:

FIG. 1 is a perspective view of the device of the invention installed between the tractor chassis and the cab frame of a typical tractor-trailer highway transport truck, the view being a partially exploded one and the tractor chassis and cab frame being shown fragmentarily;

FIG. 2, a vertical section taken along the line 2—2 of FIG. 1, and showing the air spring in elevation;

FIG. 3, a fragmentary detail view of the portion of FIG. 2 enclosed by the line 3—3 therein, the view being drawn to a larger scale and showing by full lines the device in unrestrained position and by broken lines the device in restrained position;

FIG. 4, a horizontal section taken on the line 4—4 of FIG. 2;

FIG. 5, a view similar to FIG. 3, but showing a slightly different embodiment; and FIG. 6, a view similar to FIG. 2, the device being in unrestrained position with the cab moved from operational position toward maintenance position.

DETAILED DESCRIPTION OF THE ILLUSTRATED EMBODIMENT

Figure 3:
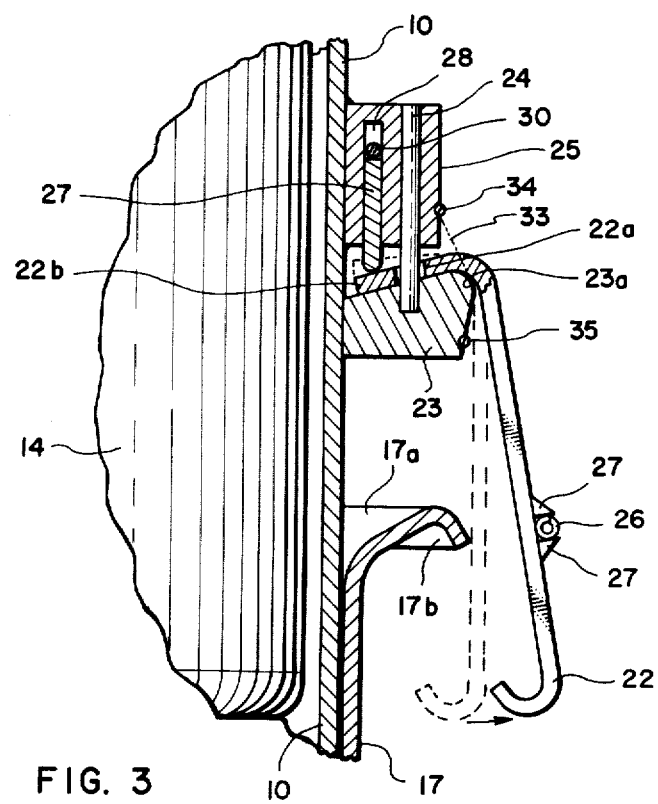
Figure 4:
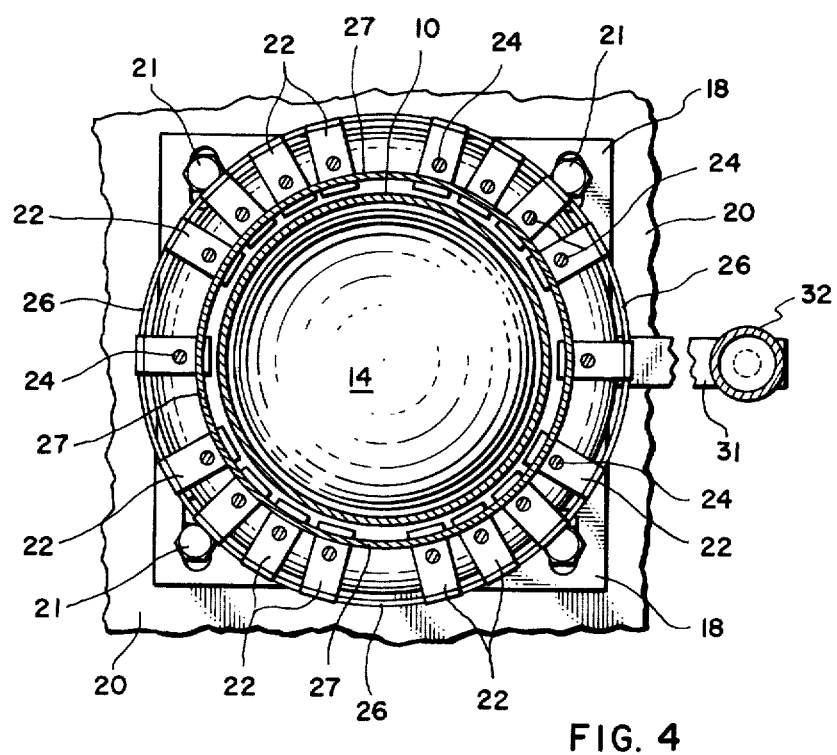

In its presently preferred, illustrated form, the cab suspension and restraining device of the invention has a housing shell 10 secured as by welding to a mounting plate 11, which, in turn, is secured to a rearward portion 12 of the underframe of the cab of an automotive, tractor-trailer, highway transport truck by means of bolts 13. A conventional air spring 14, such as made by Goodyear Tire and Rubber Company, is mounted inside shell 10 with the usual air inlet 15 at one of its ends extending through plate 11 and frame portion 12. The air inlet is adapted to be attached to a source of specially controlled pressurized air (not shown) in the usual manner. The customary bearing block 16, attached to and protruding from the other end of air spring 14, is a part of the air spring as purchased for incorporation in the device of the invention.

Housing shell 10 is adapted to telescope within a second housing shell 17 when the truck cab is in closed position down over the engine, so there can be substantially no lateral movement of the two shells relative to each other sufficient to permit effective ride-cushioning action by air spring 14. Restraining means to be described provides for such limited axial movement while guarding against separation of the telescoped housing shells until such time as it is desired to tilt the cab into maintenance position to gain access to the engine of the truck tractor unit.

Second housing shell 17 is secured to a mounting plate 18, as by welding, and plate 18 is itself secured to the chassis 20 of the truck tractor unit as by means of bolts 21.

The second shell 17 is adapted to receive the first shell 10 in telescoped relationship when the cab is in operational position with respect to the chassis. It is preferred that the lower edge margin of shell 10 be turned inwardly as shown and that the upper edge margin of shell 17 be turned outwardly as at 17a and terminates in a reverse curl portion 17b. This construction aids telescoping of the two shells when moving the cab into operational position over the engine even when the cab and chassis are out of alignment by up to three-quarters of an inch.

In operational position, shell 10 should fit snugly within shell 17 to prevent relative lateral movement of the two shells. Aluminum bearing block 16 rests upon plate 18.

In order to allow the air spring to operate properly, the two shells must be able to move in and out relative to each other. For this purpose, restraining means in the form of hook members 22 are arranged so that there is about one inch relative travel in either direction from the normal position shown. The hook members 22, when in normal position, will engage the reverse curl portion 17b of the second shell as shell 10 moves to the extreme of its outward travel with respect to shell 17. Such engagement will occur so that the shells remain within one another sufficiently to prevent relative lateral movement of the two.

An annular supporting flange 23 is secured to and projects externally from shell 10 to support a plurality of the hook members 22, which are held in place by pins 24 that extend downwardly from a second annular flange 25 secured externally of shell 10 above annular flange 23. Such pins 24 extend through oversize holes 22a in the respective hook members 22 and are held securely by flange 23.

Flange 23 is contoured re-entrantly, i.e. to slope downwardly and inwardly from an outer annular ridge 23a, and hook members 22 are secured by pins 24 to permit the hook members to freely rock on ridges 23a from restraining to unrestraining positions, see the two positions indicated by dotted and full lines, respectively, in FIG. 3. A spring, here shown as an elongate coil spring 26, encircles hook members 22 intermediate their lengths and normally urges such hook members to the restraining position of FIGS. 1 and 2. Spring 26 is held in position by any suitable means, for example, by the holding formations 27 provided on the outside faces of hook members 22. Other types of springs or elastic means could be used in place of coil spring 26 so long as hook members 22 are effectively held in restraining positions.

To cause hook members 22 to rock on ridge 23a of flange 23 against the bias of spring 26, preferably hydraulically actuated means in the form of an annular piston 27 in annular groove 28 of second annular flange 25 is provided. The portion of groove 28, above piston 27 is connected through fitting 29, FIGS. 1 and 5, to a source of pressurized hydraulic fluid, such as that provided by a manual hydraulic pump and valve unit as described in U.S. Pat. No. 3,824,043, which pressurized fluid, when introduced into groove 28 causes piston 27 to press the upper ends 22b of hook members 22 against the upper, re-entrant face of flange 23, see FIG. 3, thereby causing it to rock about ridge 23a and to move against the bias of spring 26. Groove 28 is connected by port 28a, FIG. 5, to fitting 29. An O-ring 30 rides on top of piston 27 to form a seal. When the pressure on the fluid is released, the action of spring 26 will cause the fluid to exhaust and the hook members 22 to move into their normal restraining position.

The air spring is controlled in normal manner by a source of pressurized air from an air control unit attached to air inlet 15. The air control unit and the sensors for self leveling of the cab which control such air control unit are commercial units such as made by Stewart Warner Corporation, and are used in the normal manner.

As is common with use of air spring, a standard shock absorber is arranged between the ends of the air spring. For this purpose, a steel bar 31 is attached to aluminum bearing block 16. Between one end of bar 31 and truck cab 12 is attached a standard automotive type shock absorber 32. The second shell 17 is cut away, as at 17c, FIG. 1, to allow for travel of bar 31 during movement of the cab from operational to maintenance position. The hook member 22 which is in alignment with cut away portion 17c of shell 17 will not operate as a latch so it need not have a hook end, see FIG. 1. It is preferred for load balance on piston 27 that the opposite hook member also be without its hook end. These two opposite members are used to keep spring 26 from hitting and catching on flange 17a and reverse curl 17b during the axial travel of the latch housing shells.

It is preferred to provide a rubber or vinyl dust boot 33, FIGS. 2 and 3, over the opening between flange 23 and second flange 25. Hook members 22 extend through holes cut in the boot. The boot is held in place by wire rings 34 and 35 received in respective grooves about flange 25 and flange 23, respectively.

Figure 5:
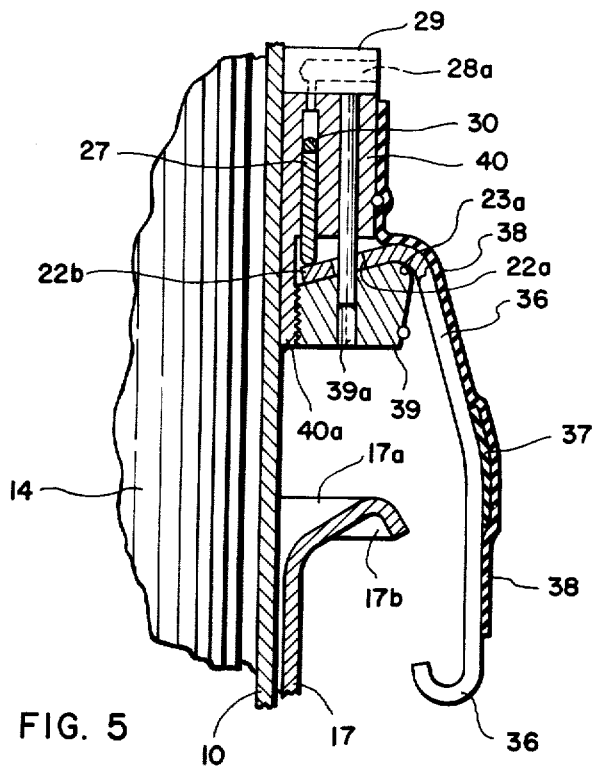
Figure 6:
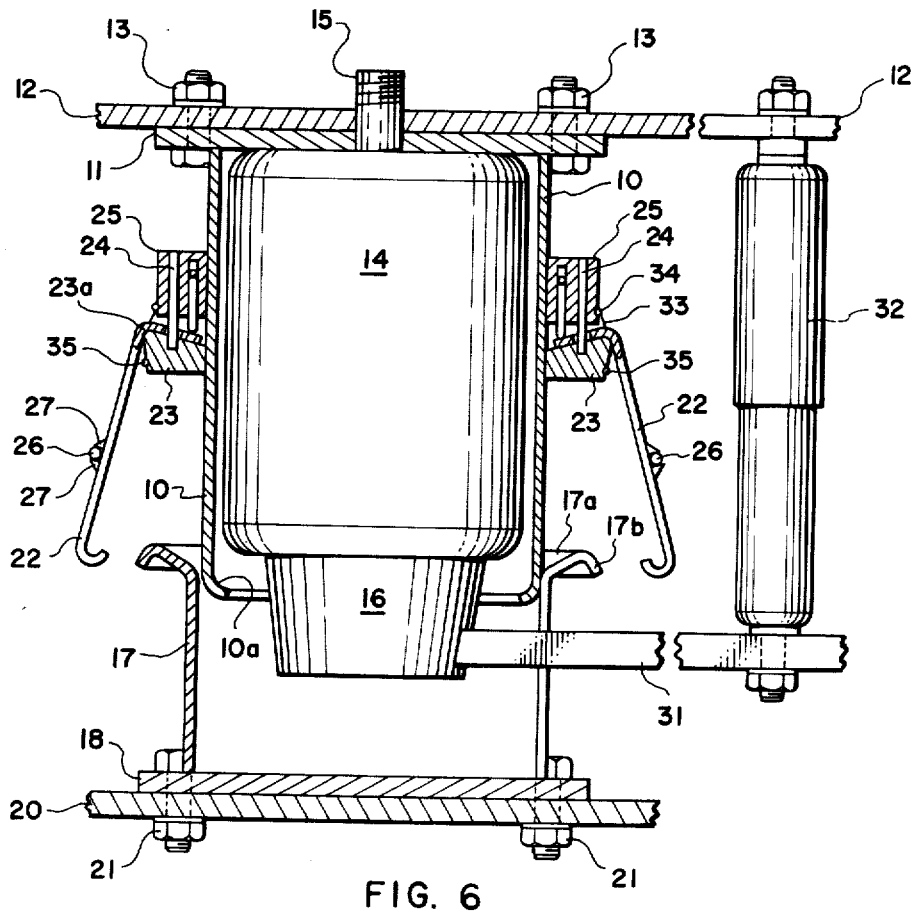

FIGS. 5 and 6 show a slightly different embodiment of the device. The hook members 36 which correspond to hook members 22 of the prior figures are bent in concave fashion away from rim 17b to insure that the hook members do not rub against rim 17b during the in and out axial movement of the shells 10 and 17. Rather than spring 26 to bias hook members 36 to their restraining positions, a band of elastic material 37, such as ⅛" thick rubber, is used. An additional band of elastic material 38, such as 1/16" thick rubber is placed over hook members 36 and extends up over flange 25. Band 38 is provided as an additional dust seal to further lessen the amount of road dirt and dust that enter the device.

Flange 39, which corresponds to flange 23, is screwed into place on a threaded lower extension 40a of second flange 40 which corresponds to second flange 25. Flange 40 is welded to housing shell 10. With the arrangement shown in FIGS. 5 and 6, flange 39 may be easily removed for replacement of piston 27 or O-ring 30, and the distance between flanges 39 and 40 can be easily adjusted in increments of one half of a complete rotation. A hole 39a is provided below each pin 24 to facilitate removal of the pins. With holes 39a, the pins can be hammered out from below.

Generally two devices will be used per cab, one on each side, although a single device can be used. If a single device is used, it is preferably located toward the center back of the cab.

While the cab suspension and restraining device is described with the shell 10 attached to the cab and the shell 17 attached to the chassis, the position of the two could be reversed.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. A cab suspension and restraining device for securing a tiltable automotive truck cab to the truck chassis, comprising a housing shell adapted to be secured to either the cab or the chassis; an air spring secured within said shell and having a bearing block extending beyond the shell; a second housing shell of larger diameter than the first and adapted to be secured to either the cab or the chassis in opposition to the first housing shell and to receive the said bearing block of the air spring as well as a portion of the first shell in the telescoped relationship; hydraulically operated restraining means for holding the two housing shells in their said telescoped relationship so as to substantially prevent relative lateral movement but to allow limited relative axial movement of the two during travel of the vehicle and to allow complete separation of the two when in unrestraining position; means for operating the restraining means; and means for operatively connecting the air spring to a source of pressurized air.

2. A cab suspension and restraining device according to claim 1, wherein the second housing shell terminates at its end that is directed toward the first housing shell in an outwardly sloped lip which tends to guide the first shell into the second as they are moved together.

3. A cab suspension and restraining device according to claim 2, wherein the lip on the second shell terminates in a reverse curled rim, and wherein the restraining means includes a plurality of hook members secured to and extending from the first shell, so that, in restraining position, the hook members will engage the rim after limited outward axial relative movement of the two shells to keep the two shells in telescoped relationship, whereby relative lateral motion of the two will be substantially prevented.

4. A cab suspension and restraining device according to claim 3, wherein the restraining means comprises support structure secured to and extending outwardly from the first housing shell about the periphery thereof, said supporting structure sloping along a re-entrant face thereof from an outer ridge formation, the hook members having angled ends mounted on said ridge formation as levers so as to rock thereon in being moved from restraining to unrestraining position and vice versa; and means for rocking said angled ends from one position to the other.

5. A cab suspension and restraining device in accordance with claim 4, wherein the support structure is an annular flange and the ridge formation is continuous about the outer periphery of the annular flange.

6. A cab suspension and restraining device in accordance with claim 4, wherein the means for rocking the angled ends of the hook members includes resilient means operable on portions of the hook members remote from said ends and an annular piston operable to push said ends in opposition to the force of said resilient means.

7. A cab suspension and restraining device in accordance with claim 6, wherein the piston is hydraulically actuated and the resilient means is an annular coil spring encircling the hook members in common.

8. A cab suspension and restraining device in accordance with claim 6, wherein the piston is hydraulically actuated and the resilient means is a band of elastic material encircling the hook members in common.

9. A cab suspension and restraining device in accordance with claim 8, wherein the elastic material is rubber.

10. A cab suspension and restraining device in accordance with claim 6, wherein the annular piston is mounted in an annular flange extending outwardly from the first housing shell about the periphery thereof adjacent to the support structure for the hook members and facing the sloping re-entrant face thereof; and wherein the angled ends of the hook members are secured for free rocking movement by pins extending through oversize receiving holes in the respective angled ends and secured at their opposite ends in the annular flanges, respectively.

* * * * *